United States Patent
Oohashi (10) Patent No.: US 7,539,556 B2
(45) Date of Patent: May 26, 2009

(54) FACE IMAGE ACQUISITION METHOD AND FACE IMAGE ACQUISITION SYSTEM

(75) Inventor: Takahiro Oohashi, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 858 days.

(21) Appl. No.: 11/028,152

(22) Filed: Jan. 4, 2005

(65) Prior Publication Data

US 2005/0151842 A1    Jul. 14, 2005

(30) Foreign Application Priority Data

Jan. 9, 2004    (JP)    ............... 2004-004010

(51) Int. Cl.
*G06K 9/00*    (2006.01)

(52) U.S. Cl. ...................... 700/245; 382/118
(58) Field of Classification Search ................ 700/245, 700/246; 348/402.1; 382/118, 236, 294, 382/115, 107
See application file for complete search history.

(56) References Cited

U.S. PATENT DOCUMENTS

| | | | |
|---|---|---|---|
| 5,774,591 A * | 6/1998 | Black et al. ................ | 382/236 |
| 6,430,306 B2 | 8/2002 | Slocum et al. | |
| 6,714,840 B2 * | 3/2004 | Sakaue et al. .............. | 700/245 |
| 7,139,642 B2 * | 11/2006 | Kamoto et al. ............. | 700/248 |

FOREIGN PATENT DOCUMENTS

| | | |
|---|---|---|
| EP | 1343115 | 11/2006 |
| JP | 02-240684 | 9/1990 |
| JP | 07-295637 | 11/1995 |
| JP | 09-201348 | 8/1997 |
| JP | 2001-357391 | 12/2001 |
| JP | 2003-281653 | 10/2003 |
| JP | 2004-357915 | 12/2004 |

OTHER PUBLICATIONS

Honda Worldwide site, Honda Motor Co., Ltd., Press Release, "Introducing a New ASIMO Featuring Intelligence Technology", Dec. 5, 2002, pp. 1-3.
Takayiki Kanda, et al. (ATR Intelligent Robotics Laboratories, Osaka University)- IEEE International Cinference on Humanoid Robots, "A practical experiment with interactive humanoid robots in a human society", Oct. 2003, pp. 1-18.
German Office Action for Application No. 10 2005 001 026.1-53, dated Jan. 5, 2007.

* cited by examiner

*Primary Examiner*—Dalena Tran
(74) *Attorney, Agent, or Firm*—Squire, Sanders & Dempsey, L.L.P.

(57) ABSTRACT

A face image acquisition system which has a robot and a motion controller, the robot includes a camera and a arm, the motion controller has a visitor detector, a directive generator, and a face image registration unit, in the motion controller, a directive which controls the motion of the robot is generated by the directive generator and is transmitted to the robot when the visitor is detected by the visitor detector, and the robot offers a handshake to the visitor in compliance with the directive, and the robot acquires the face image of the visitor during the handshake with the visitor, and the acquired face image is stored in the face image registration unit.

19 Claims, 6 Drawing Sheets

FACE IMAGE ACQUISITION METHOD AND FACE IMAGE ACQUISITION SYSTEM

BACKGROUND OF THE INVENTION

Field of the Invention

The present invention relates to a face image acquisition method and a system realized by using a robotic apparatus (called "a robot" hereinafter) that has cameras and an arm.

For the purpose of improving work efficiency and saving labor cost, a reception system to identify visitors and give them particular information for guidance has been studied and developed to create new robot application technologies.

As an example of these kinds of the reception system, an invention which performs a receptionist work using a robot has been discovered in Japanese unexamined Patent Publication JP No.H02-240684 and No.H07-295637.

In the invention disclosed in these Patent Publications, since the receptionist work for a visitor is performed using a robot which has only an auxiliary function for the receptionist work, the improving of the work efficiency and the saving labor cost cannot be achieved. Especially, the robot used in these inventions does not have a function for identifying a visitor, and this limits the motion of the robot to a standardized action.

Here, inventors of the present invention focused on a face recognition technique which has been discovered in Japanese unexamined Patent Publication JP No.2001-266152, and have tried to adopt this face recognition technique into the robot, and has realized that the reception system which can perform a receptionist work to respective visitors individually using a face recognition technique.

In the above described reception system using a human-shaped robot, the face image of a visitor has to be enrolled in advance for performing the face recognition of a visitor.

Furthermore, a visitor is forced to be at standstill during the image pickup of the face image using a video camera etc., in order to improve the accuracy of the face recognition of the visitor.

Therefore, the image pickup of the face image has to be performed at a reception desk etc., in order to enroll the face image of the visitor whose face image is not registered. This disturbs the smooth receptionist work.

Therefore, the apparatus, which can perform the image pickup of the face image of a visitor without making the visitor aware of the image pickup, and which can acquire the front face image of a visitor and can improve the accuracy of the face recognition, has been required.

SUMMARY OF THE INVENTION

The present invention relates to a face image acquisition method using a robot having a camera and a arm. This methods includes the steps of; a) detecting a target person whose face image is acquired in an image obtained by the camera; b) moving the arm toward the target person; c) performing an image pickup of the face image of the target person during the handshake with the target person; and d) storing the obtained face image in a recording medium.

The present invention, furthermore, relates to a face image acquisition system which includes a robot having a camera and a arm and a motion controller. The motion controller has; a visitor detector detecting a presence of a visitor; a directive generator generating a directive which controls the motion of the robot; and a face image registration unit holding a face image of the visitor.

In this system, the motion controller transmits the directive generated in the directive generator to the robot when the visitor is detected by the visitor detector; the robot moves the arm toward the visitor for offering a handshake with the visitor in compliance with the directive, and performs an image pickup of a face image of the visitor using the camera during the handshake with the visitor; and the motion controller stores the face image acquired by the robot in the face image registration unit.

The present invention, still furthermore, relates to a face image acquisition system, which has a robot having a camera and a arm and a motion controller. The motion controller includes; a personal information database storing a personal information, which is used for an identification of a person, and a face image of the person associated with the personal information; a visitor detector detecting a presence of a visitor and acquiring a face image of the visitor; an information manager generating essential information to be used for generating a directive which controls the motion of the robot; and a directive generator generating a directive based on essential information.

In this system, the motion controller refers to the personal information database based on the face image acquired by the visitor detector in order to identify the visitor when the visitor is detected by the visitor detector; if the appropriate personal information is not found in the personal information database, the information manager generates the ID information by which the visitor is identifiable, and generates the essential information, from which the directive generator generates the directive which commands the robot to acquire the face image of the visitor; the robot moves the arm toward the visitor for offering a handshake with the visitor in compliance with the directive, and performs an image pickup of a face image of the visitor using the camera during the handshake with the visitor; and the motion controller regards the ID information as the personal information, and stores the face image acquired by the robot in the personal information database together with the personal information.

In the present invention, preferably, the robot requests the visitor to input the visitor information, which is information on the visitor, and the motion controller stores the visitor information on the personal information database together with the personal information.

In this case, the information on the visitor whose information has not recorded in database can be obtained.

In the present invention, the robot acquires a predetermined numbers of face images of the visitor when the image pickup of the face image of the visitor is performed, and computes the similarity of the last face image against the class image, which is generated from all face images excepting the last face image, and repeats the image pickup of the face image till the computed similarity exceeds a threshold value.

In the present invention, the motion controller refers to the personal information database based on the face image acquired by the visitor detector in order to identify the visitor when the visitor is detected by the visitor detector; if the appropriate personal information is found in the personal information database, the information manager generates the essential information, from which the directive generator generates the directive which commands the robot to compute the similarity of the face image of the visitor; the robot moves the arm toward the visitor for offering a handshake with the visitor in compliance with the directive, and performs an image pickup of a face image of the visitor using the camera during the handshake with the visitor, and the robot computes the similarity of the face image obtained by the image pickup against the class image, which is generated from face images stored in the personal information database, and repeats the image pickup of the face image of the visitor till the computed similarity exceeds a threshold value; and the motion controller stores all face images acquired by the robot in the personal information database.

In this case, the identification of the visitor can be achieved, and all face images acquired by the robot are stored in the personal information database in this identification in addition to the face images stored in advance. Thus, the class image generated from face images stored in the personal information database can reflect the change of the visitor face. Thereby, the accuracy of the identification of the visitor can be maintained even if the visitor gets old.

In the present invention, the robot further includes a handshake sensor which checks whether or not the visitor has accepted the arm, and the robot checks whether or not the visitor has accepted the arm when the arm of the robot was moved toward the visitor, and the robot performs the image pickup of face image of the visitor by camera when it is judged that the visitor has accepted the handshake.

In the present invention, preferably, the motion controller searches the personal information which has an empty content in predetermined information items, and delete such personal information at a fixed cycle together with the face image.

In this case, since the personal information which has an empty content in predetermined information items is deleted at a fixed cycle, data amount in database can be controlled.

According to the present invention, since the visitor stands still at a predetermined position in order to shake hands with the robot, the face image of the visitor can be acquired at the same location without causing an excess burden on the visitor. This is because the image pickup is performed during a natural motion of the handshake.

Additionally, the robot does not repeat the acquisition of the face image against the visitor whose face image was once acquired. This is because new ID number is assigned to the unscheduled visitor and is stored in the database together with his face image, if the visitor whose arrival is not scheduled has arrived.

According to the present invention, since face image to be stored in database has a sufficient similarity, the accuracy of the identification of the visitor can be improved.

According to the present invention, since the face image of the visitor is not acquired if the identification of the visitor has missed, the update of the visitor information by incorrect face image can be avoided.

DETAILED DESCRIPTION OF THE PREFERRED EMBODIMENT

The preferred embodiments of the present invention will be described with reference to the attached drawings.

As an example of the present invention, a system, which is disposed in an reception area in an office building of a company and is used for an receptionist work for a visitor, will be explained. Here, the system performs the receptionist work using a human-shaped autonomous mobile robot which can perform an bipedal walking.

Figure 1:
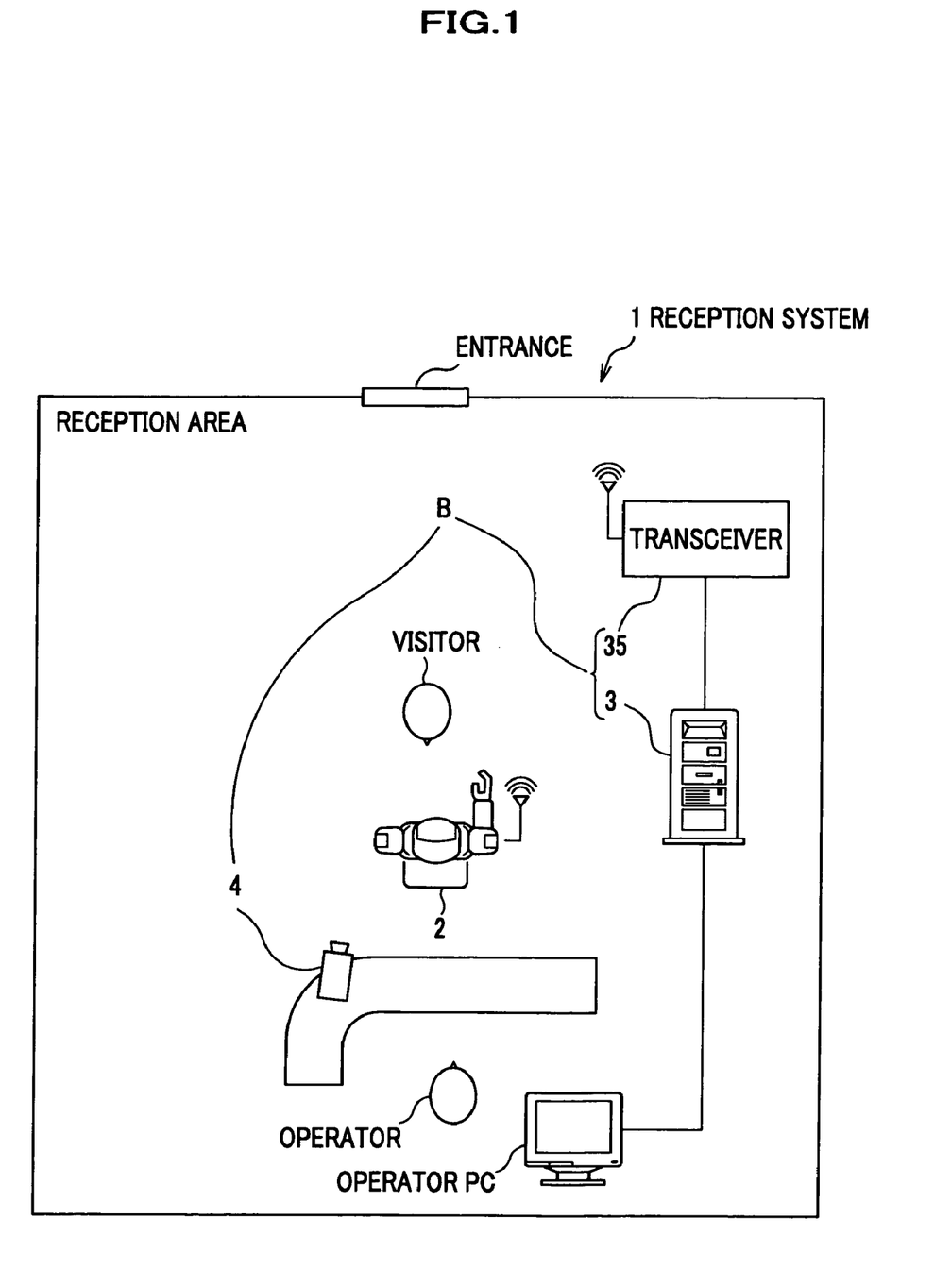
FIG. 1 is a schematic diagram showing a reception area to which the reception system according to the preferred embodiment of the present invention is arranged.

As shown in FIG. 1, the reception system 1 is mainly composed of a robot 2 and a reception controller B.

The reception controller B consists of a robot support unit 3, a transceiver 35 and a monitoring camera 4.

In this embodiment, as shown FIG. 1, the robot support unit 3 is placed in a reception area. But, this robot support unit 3 may be placed in another place other than the reception area.

[Robot]

Next, the explanation about the robot 2 will be given with reference to FIG. 2.

A robot 2 of the present embodiment is a bipedal walking robot and is also a human-shaped autonomous mobile robot.

The robot 2 includes cameras 21a, a microphone 22a, a speaker 23a, a robot control unit 2A, an autonomous travel unit 26b, a working unit 27 and a robot transceiver 28.

The robot control unit 2A further includes a image analyzer 21b, a voice analyzer 22b, a voice synthesizer 23b, a response controller 24, a position analyzer 25, a travel controller 26a, a scenario database 29a and a map information database 29b.

Here, each component of the robot 2 will be explained in detail.

The camera 21a obtains an image of surroundings and a face image of a visitor, and sends them to the image analyzer 21b. Here, a monochrome or color video camera is adopted as the camera 21a of the present embodiment.

In this embodiment, a total of two cameras are installed on the robot 2. This is because the distance from the robot 2 to a visitor and the relative position of the robot 2 in the reception area are obtained by computing the parallax between images obtained by each camera.

In this embodiment, additionally each camera 21a is adapted to move, using a drive unit, such as a motor (not shown), in a left-and-right direction and in an ups-and-downs direction so that the cameras can be directed to the desired direction.

The image analyzer 21b converts the data format of an image or a face image which are entered from the camera 21a, into a digital format, and sends them to the response controller 24 and the position analyzer 25.

The image analyzer 21b has a function to perform the automatic tracing of a moving object and the extraction of the moving object from an image, using Active Contour Model (such as SNAKES). The image analyzer 21b also has a function to extract the face image of the visitor in a predetermined size Here, the extracted face image is compared with the face image stored in (or sent from) a visitor information database 34b of the robot support unit 3 or the face images obtained prior to this extracted image. Thus, the image analyzer 21b computes the similarity from this comparison, and outputs the computed result to the response controller 24.

The microphone 22a collects the sounds from surroundings and the conversations of a visitor, and sends them to the voice analyzer 22b as sound data. The voice analyzer 22b refers to a prescribed word database based on sound data entered from the microphone 22a, and recognizes the meanings of the conversations of the visitor.

The speaker 23a sounds a voice message synthesized in the voice synthesizer 23b in order to facilitate the communication with a visitor through talk.

The speaker 23a also sounds a voice message, which is synthesized in accordance with a scenario recorded on the scenario database 29a or a directive sent from a directive generator 33 (see FIG. 3) of the robot support unit 3.

The response controller 24 generates conversation data based on information sent from the robot support unit 3, an image information entered from the image analyzer 21b, and a sound data entered from the microphone 22a.

The response controller 24 also controls the motion of the robot 2, such as a lifting of the robot's arm to a certain height, by sending a command signal to the working unit 27.

The response controller 24 sends a reception start signal to the robot support unit 3 through the robot transceiver 28, when the robot 2 starts the reception action in response to a directive sent from the robot support unit 3.

The response controller 24 also sends a reception termination signal to the robot support unit 3, when the reception action by the robot 2 is terminated.

The response controller 24 controls the acquisition of the face image of the visitor in accordance with the similarity computed in the image analyzer 21b.

The position analyzer 25 computes a position data, which indicates the present position of the robot 2, and transmits the position data to the robot support unit 3. Here, the position data is computed based on images, which are obtained by each camera 21a and are entered through the image analyzer 21b, and map information stored in the map information database 29b.

A travel controller 26a controls the operation of the autonomous travel unit 26b in compliance with position data entered from the position analyzer 25, map information stored in the map information database 29b, and a directive sent from the robot support unit 3

The autonomous travel unit 26b is a device for performing an autonomous travel of the robot 2. In this embodiment, the leg section of the robot 2 corresponds to the autonomous travel unit 26b.

The working unit 27 is a device for controlling a work (a motion except traveling) of the robot 2 in compliance with a command signal entered from the response controller 24. In this embodiment, the arm section of the robot 2 corresponds to the working unit 27.

The robot transceiver 28 is a device for performing a wireless communication with the robot support unit 3.

The scenario database 29a stores a plurality of model sentences and the relevant information of the model sentence therein. Here, the model sentence is conversation data to be used when the robot communicates with a visitor through a conversation. For example, "how do you do" and "let me know a name, please" are this model sentence.

In this embodiment, the information to be required when the robot 2 makes the specific action (e.g. handshake action) being related to the conversation data, or the information to be used when the robot 2 moves to the home position in the reception area correspond to the relevant information. Additionally, information to be required for generating a command signal in the response controller 24 are stored in the scenario database 29a.

The map information database 29b stores map information with regard to an area (reception area) where the robot 2 can move around. The map information stored in the map information database 29b is the same data as stored in a map information database 34a of the robot support unit 3. In this embodiment, the update (or synchronization) of the map information can be done by performing the data exchange between the robot 2 and the robot support unit 3.

[Reception Controller]

Figure 3:
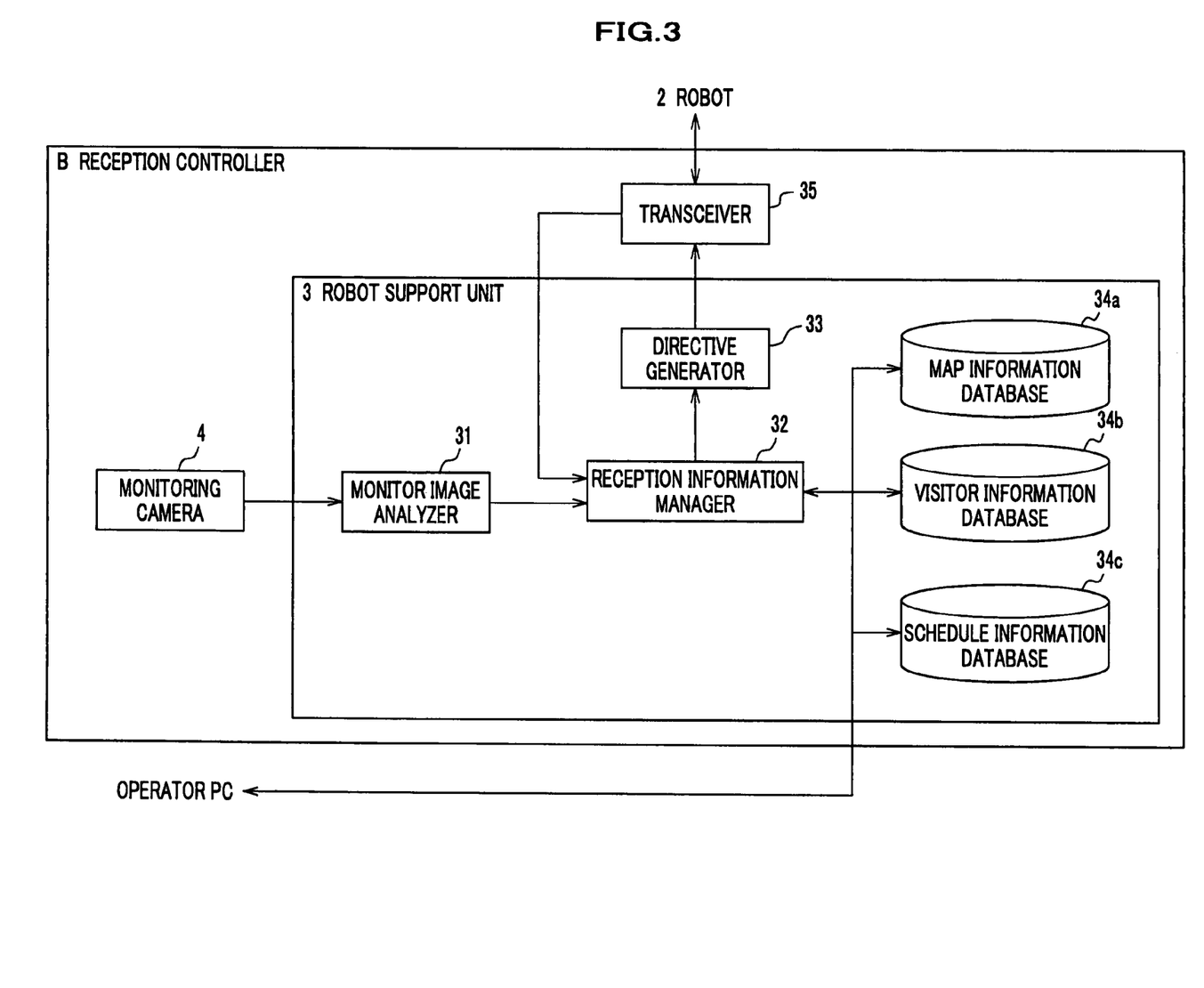
FIG. 3 is a block diagram showing the reception controller of the reception system according to the preferred embodiment of the present invention.

Next, the reception controller B as the motion controller will be explained with reference to FIG. 3.

The reception controller B is mainly composed of the robot support unit 3, the monitoring camera 4 and the transceiver 35.

The robot support unit 3 includes a monitor image analyzer 31, a reception information manager 32, the directive generator 33, a map information database 34a, the visitor information database 34b, and a schedule information database 34c.

The robot support unit 3 is adapted to exchange various information, such as the directive, reception start signal etc., with the robot 2 through the transceiver 35.

The monitor image analyzer 31 converts the data format of a monitor image, which is obtained by the monitoring camera 4, into digital format.

The monitor image analyzer 31 has a function to perform the automatic tracing of a moving object and the extraction of the moving object, using Active Contour Model (such as SNAKES), and can detect the presence of a visitor in the monitor image.

The monitor image analyzer 31 also has a function to extract the face image of the visitor in a predetermined size.

The monitor image analyzer 31 has a function to generate location information, which indicates the position within the reception area of the visitor and the robot 2 and which also indicates a relative position between the visitor and the robot 2.

The monitoring camera 4 obtains an image of the reception area including the entrance, and sends it to the monitor image analyzer 31. Here, reception area is an area the robot and the person can move around.

The monitor image analyzer 31 analyzes the image of the reception area using Snakes and detects the moving object therefrom. Then, monitor image analyzer 31 regards the moving object as a visitor and extracts the face image of the visitor. The monitor image analyzer 31 outputs the face image of the visitor, as image information, to the reception information manager 32 together with visit time information, which indicates the time of when the visitor was detected by the monitor image analyzer 31.

The monitor image analyzer 31 specifies the positions of the visitor and the robot 2 in the reception area, and generates the location information. Then, monitor image analyzer 31 outputs the location information to the reception information manager 32. In this embodiment, the monitor image analyzer 31 and the monitoring camera 4 serve as a visitor detector.

The map information database 34a stores map data and map information with regard to the area (reception area) where the robot 2 can move around.

In this embodiment, the information with regard to the layout of the reception area and the information with regard to the position of the obstacle, such as a foliage plant and a sofa bench, are adopted as the information item of the map information.

In the present embodiment, additionally, the update of map data and map information can be performed through an operator PC (see FIG. 1). Therefore, map data and map information can be changed in accordance with the change of the layout of the reception area and the change of the position of the obstacle, such as a foliage plant and a sofa bench.

In this embodiment, additionally, since updated map data and map information are transferred to the robot 2 through the transceiver 35 when map data and map information are updated, the map data and map information stored in the map information database 29b (see FIG. 2) in robot 2 can be updated without time-lag.

The visitor information database 34b, which serves as personal information database, stores visitor information and face image of the visitor. Here, visitor information and face image corresponding to the visitor are being correlated each other in the visitor information database 34b.

In this embodiment, an unique identification number (ID number) assigned to a visitor, a name of a visitor, a company name to which a visitor belongs, and a business title of a visitor are adopted as one of information item of the visitor information.

TABLE 1

An example of generic visitor information for the portfolios of visitors

| ID number | Name | Company | Tittle | ... |
|---|---|---|---|---|
| 0001 | YAMADA Taro | XX Co. Ltd. | Section Manager | |
| 0002 | YAMAKAWA Hanako | Corp. XX | (null) | |
| 0003 | (null) | (null) | (null) | |
| . | . | . | . | |
| . | . | . | . | |
| . | . | . | . | |

The table 1 shows an example of each information item of visitor information stored in the visitor information database 34b. In this embodiment, as shown in table 1, visitor information includes a plurality of information items, and all the items except ID number are not indispensable item. Therefore, the information item whose content is empty (no data) is indicated as "null" in this table.

In the present embodiment, the reception information manager 32 deletes all data (information) being correlated with ID number whose information item on "name" is "null", at a predetermined cycle. Here, the deletion of information may be performed at every few days or every time the robot 2 shut down.

In the present embodiment, data of at least one information item may be used as a "key" for searching schedule information stored in the schedule information database 34c.

Here, the update of each content of the visitor information stored in the visitor information database 34b is performed through the operator PC or by using data directly acquired by the robot 2.

In the present embodiment, for deleting rarely-used visitor information, rarely-used visitor information is distinguished based on whether or not the content of the predetermined information item has "null".

But, the search of rarely-used visitor information may be performed using visitor's visit time, which is included in visitor information and is generated by the monitor image analyzer 31. In this case, for example, visitor information is deleted when a predetermined time, e.g. 1 week, has passed since visit time.

In the present embodiment, the total number of the face image for each visitor (ID number) that can be stored in the visitor information database 34b may be limited. In this case, the oldest face image is replaced with new face image when the number of the face image reaches the limit number.

In the present embodiment, the visitor information may include the number of the visit as the information item. In this case, the retention period of the face image can be variable based on the number of the visit.

The schedule information database 34c stores visitor information, such as ID number, and schedule information therein. Here, each content of the visitor information and each content of schedule information are correlated each other using ID number as key.

In this embodiment, a visiting date, a visit time, a company name to which a visitor belongs, a business title of a visitor, a name of visitor, a name of person to have a meeting, and a visiting place are adopted as information item of the schedule information. Here, each content being included in schedule information is entered in advance through the operator PC.

The reception information manager 32 generates and manages an essential information based on image information entered from the monitor image analyzer 31, location information entered from the monitor image analyzer 31, position data entered from the position analyzer 25 of the robot 2, and various information stored in each database (i.e. the map information database 34a, the visitor information database 34b, and the schedule information database 34c).

Here, the generation of essential information will be explained.

First, the monitor image analyzer 31 generates visit time information indicating when a visitor has arrived, a face image in a predetermined size of the visitor obtained from the monitor image, and location information indicating the position within the reception area of the visitor and the robot 2. Then, the generated visit time information, face image, and location information are supplied to the reception information manager 32.

The reception information manager 32 searches the visitor information database 34b based on the face image entered from the monitor image analyzer 31, and obtains visitor information of the person whose face image has a high correlation with the face image entered from the monitor image analyzer 31.

Here, as an example of the method for searching face image having a high correlation with the face image entered from the monitor image analyzer 31, the Eigenspace Method based on Principal Components Analysis can be used. In this method, face image, which is extracted in a predetermined size from a monitor image, is transformed into a set of vectors by normalization while considering brightness of each pixel on face image as a feature.

Then, the linear direction, in which a set of vectors are best represented, is identified by choosing the directions of largest variance, and next a feature vector of face image is determined based on the linear direction.

The correlation of the face image obtained from the monitoring image with the face image stored in the visitor information database 34b is computed by measuring the distance between the feature vector determined from the face image obtained from the monitoring image and the feature vector of the face image stored in the visitor information database 34b.

Then, the face image whose correlation value exceeds a threshold value and records the highest value is searched from among face images stored in the visitor information database 34b. If such face image exists, a person associated with this face image is regarded as the visitor.

In the present embodiment, another conventional method for searching face image having a high correlation with the visitor may be adoptable.

If such face image exists, the reception information manager 32 searches the schedule information database 34c based on one (e.g. ID number) of information item among the visitor information, and obtains the schedule information of the corresponding visitor.

Then, the reception information manager 32 generates the essential information based on the visitor information, the schedule information of the visitor, and location information entered from the monitor image analyzer 31, and sends the essential information to the directive generator 33. Here, the essential information is used when the directive generator 33 generates a directive by which the robot 2 makes a reception action.

If such face image does not exist, the reception information manager 32 assigns new ID number to the visitor, and generates the essential information to be used for generating the directive by which the robot 2 performs the image pickup of the face image of the visitor. Then, the reception information manager 32 outputs the essential information to the directive generator 33.

The directive generator 33 generates a directive based on the essential information entered from the reception information manager 32, and sends it to the robot 2. In this embodiment, since the detailed reception action differs in each visitor, the different directive is generated for each visitor and is supplied to the robot 2. Thereby, the robot 2 takes a reception action in accordance with the directive which was specifically made for each visitor.

The reception action to be performed by the robot 2 will be explained later in detail.

The transceiver 35 performs the exchange of information with the robot transceiver 28 (see FIG. 2) by wireless.

To be more specific, in the present embodiment, the transceiver 35 transmits the directive, which is entered from the directive generator 33 sequentially, to the robot 2. The transceiver 35 receives an image information (face image) obtained in the image analyzer 21b of the robot 2.

The transceiver 35 also receives the reception start signal, reception termination signal and position data, which are transmitted from the robot 2, and sends them to the robot support unit 3.

In the present embodiment, reception start signal, reception termination signal and position data are supplied to the reception information manager 32 and is used for the update of the visitor information.

Thereby, since the information item among the visitor information that indicates whether or not the visitor has accepted the reception action, is updated, the checking of whether or not the visitor has accepted the reception action can be achieved by reviewing the visitor information.

Additionally, if this information is combined with the schedule information, whether or not the reception procedure of the visitor whose arrival is scheduled has been completed can be recognizable.

The operator PC is used for the input, display, and update of the information stored in each data base, and is also used for checking of whether or not each person whose data is stored in the database has accepted the reception action.

[Reception Action for New Vistor]

Next, the reception action to be performed for a new visitor using the reception system 1 will be explained mainly with reference to the flow chart shown in FIG. 4, and appropriately with reference to FIG. 2 and FIG. 3.

First, the monitor image analyzer 31 checks the presence of a visitor within a monitor image, which is obtained by the monitoring camera 4 (Step S401). If no visitor is detected (Step S401, NO), the process of Step S401 is repeated till a visitor is detected within a monitor image.

When a visitor is detected in the step S401 (Step S401, YES), the monitor image analyzer 31 extracts the face image in a predetermined size of the visitor from the monitor image, and generates the location information. Then, the monitor image analyzer 31 outputs the face image and the location information to the reception information manager 32 (Step S402)

Next, the reception information manager 32 of the robot support unit 3 checks whether or not the corresponding face image, which has a sufficient similarity with the face image obtained from the monitor image, exists in the visitor information database 34b (Step S403) using Eigenspace method.

If face image does not exist (Step S403, NO), the process proceeds to next step. If face image exists (Step S403, YES), the process is moved to the reception action for guide ("A" in figure).

Here, it is preferable to decrease the number of face images, which are stored in the visitor information database 34b and are used for searching the face image having a sufficient similarity with the face image obtained from the monitor image. In the present embodiment, therefore, the face image whose content with regard to the scheduled arrival time is not around current time is excluded from the face images to be used for computing the similarity. Thereby, the accuracy of the computed result of the similarity can be improved and the time to be required for computing can be reduced.

If face image does not exist (Step S403, NO), the reception information manager 32 of the robot support unit 3 assigns a new ID number to the present visitor, and stores the ID number and the visitor's visit time in the visitor information database 34b (step S404) as visitor information of the present visitor.

The reception information manager 32 refers to location information entered from the monitor image analyzer 31, map information stored in the map information database 34a, and position data entered from the robot 2, and then generates the essential information for generating the directive, by which the robot 2 performs the reception action to the visitor (Step S405). The reception information manager 32 sends the essential information to the directive generator 33.

Here, the reception action program serves as a directive which commands the image pickup of the face image of the visitor.

The directive generator 33 generates a directive, by which the robot 2 approaches toward the visitor up to the predetermined distance, and is sent to the robot 2 via the transceiver 35 (the step S406).

In the present embodiment, for the purpose to approach the particular visitor in the reception area, the directive includes the position information by which the position in the reception area of the visitor can be recognized or the program by which the robot 2 goes to the visitor by the bipedal walking.

When the directive is received by the robot 2 (the step S407), the robot 2 specifies the visitor based on the position information included in the directive, and send the reception start signal indicating the start of the reception action to the robot support unit 3 (Step S408).

The reception information manager 32 in the robot support unit 3 adds the reception start signal to the visitor information, which is the information corresponding to the present visitor and is stored in the visitor information database 34b (Step S409). Thereby, the visitor information is updated.

The robot 2 moves to the position wherein the communication with the visitor is performable (Step S410).

After the arrival of the robot 2 at the target position, the reception information manager 32 of the robot support unit 3 generates essential information by which the directive generator 33 generates the directive which commands the robot 2 to perform the motion to greet with the visitor. Then, the directive is sent to the robot 2 (Step S411).

In the present embodiment, the timing of the output of the directive from the directive generator 33 may be variable. For example, the directive generator 33 may send the directive, when the approach of the robot 2 to the visitor is terminated, or when the remaining distance between the robot 2 and the visitor exceeds the threshold value. Here, the distance between the robot 2 and the visitor is computed based on the location information entered from the monitor image analyzer 31.

In the present embodiment, furthermore, the scenario database 29*a* of the robot 2 may store the scenario (program), by which the robot 2 performs the motion to give the robot's hand to the visitor.

In the present embodiment, when the directive, by which the robot 2 performs the motion to greet with the visitor, is received by the robot 2, the robot 2 performs the motion to give the robot's hand to the visitor in order to offer to shake hands (Step S412). Simultaneously, the robot 2 refers to scenario information stored in the scenario database 29*a*, and sounds the voice message "how do you do" based on the scenario.

Then, the robot 2 judges whether or not the robot 2 has received a handshake from the visitor (Step S413).

In this embodiment, this judgment can be done by using a contact sensor (not shown) disposed on the hand of the robot 2 or by checking whether or not the visitor has exchanged the handshake with the robot 2. Here, the checking whether or not the visitor has exchanged the handshake with the robot 2 is performed in the image analyzer 21*b* of the robot 2 based on the image obtained by the camera 21*a*.

In the present embodiment, checking of whether or not the visitor has exchanged the handshake with the robot 2 may be omitted. In this case, the process is moved to next step after the robot 2 gave the robot's hand to the visitor. This omission of the checking enables the construction of the robot 2 to be more simple. But, this decreases the probability of the successful image pickup of the visitor's front face image.

If the robot 2 does not receive a handshake from the visitor (Step S413, NO), the processing proceeds to Step S415 without having a communication with the visitor.

If the robot 2 has received a handshake from the visitor (Step S413, YES), the registration of the face image of the visitor is performed (Step S414).

Figure 2:
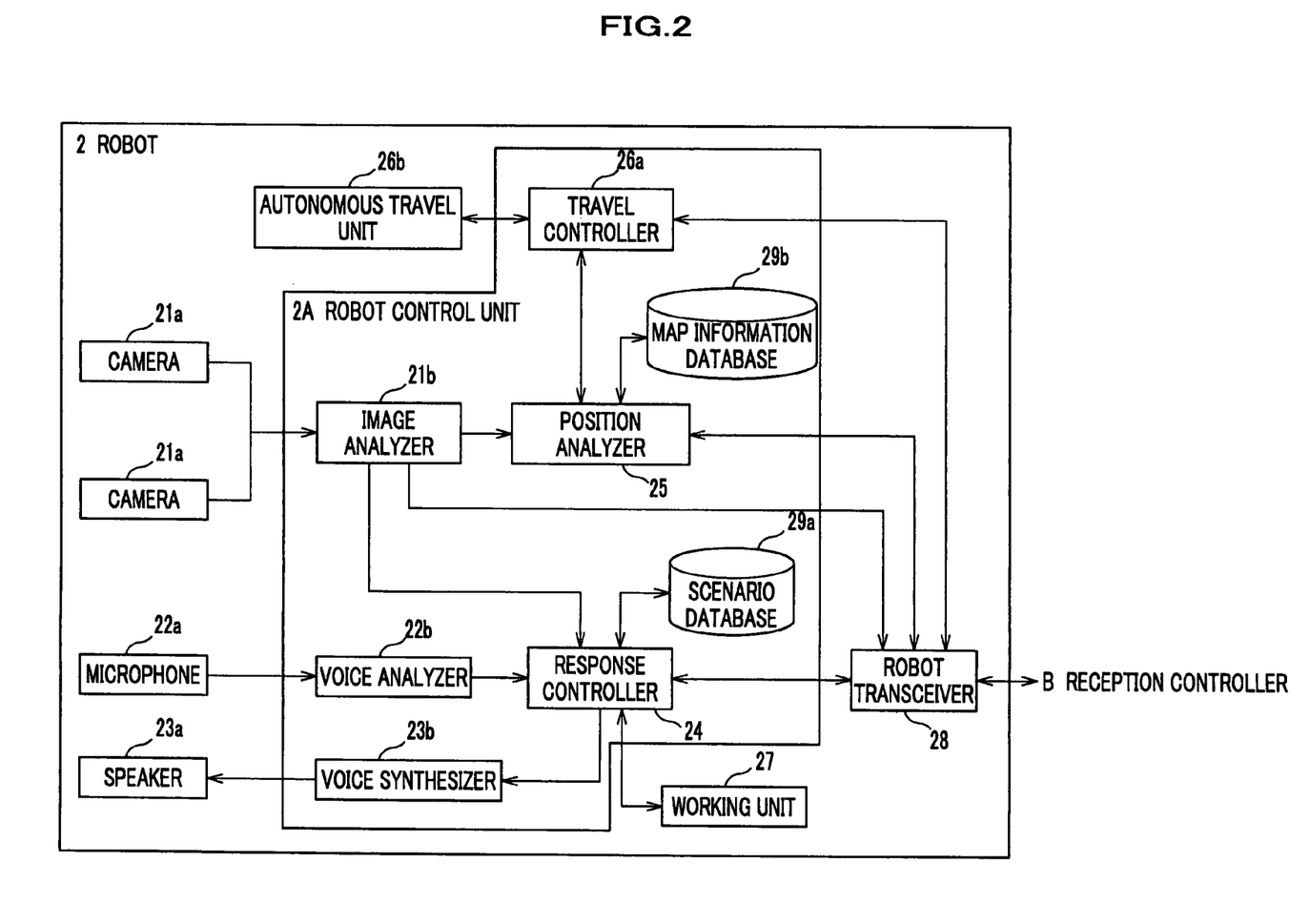
FIG. 2 is a block diagram showing the construction of the robot of the reception system according to the preferred embodiment of the present invention.
Figure 5:
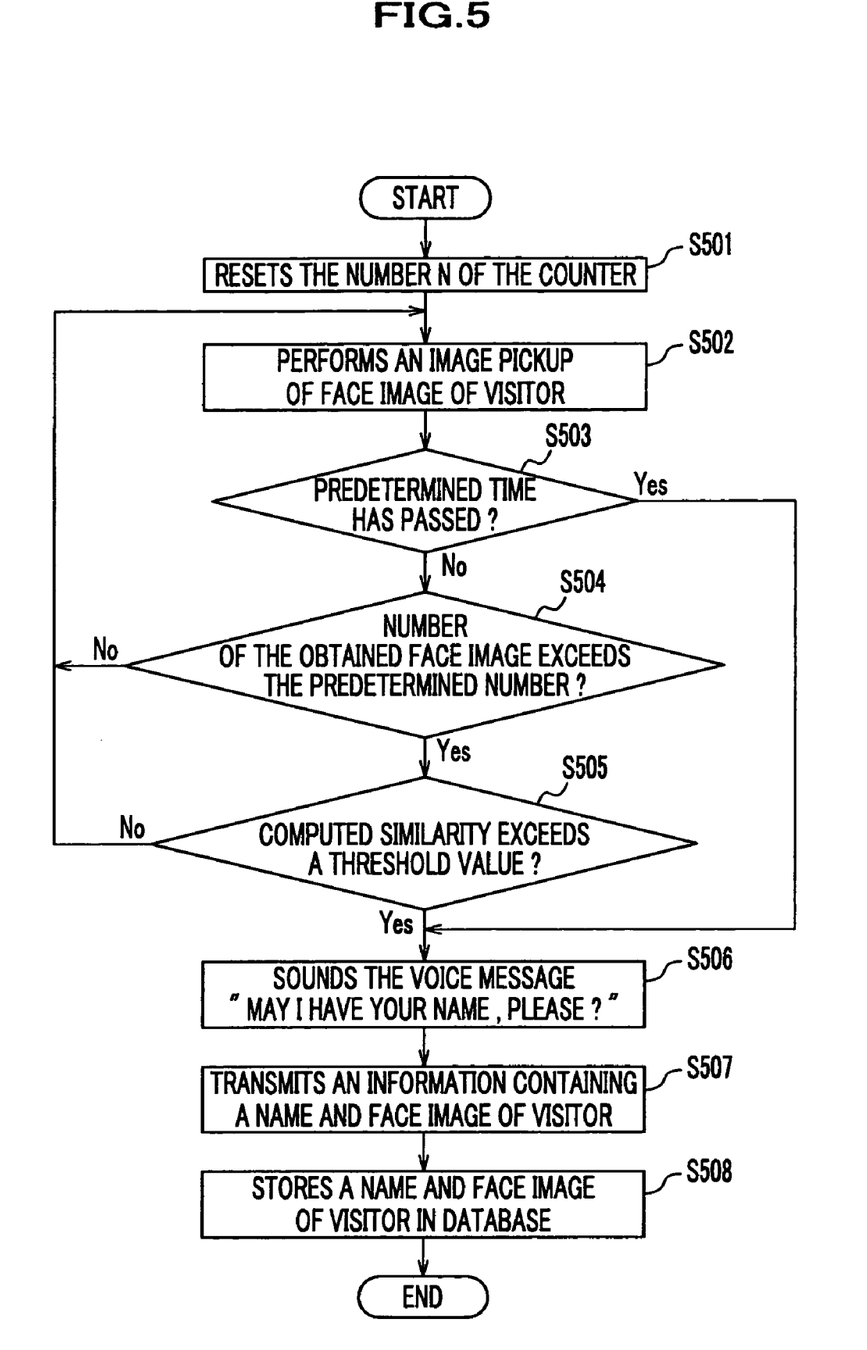
FIG. 5 is a flow chart for explaining process of face image registration of visitor using the reception system according to the preferred embodiment of the present invention.

Here, the detailed explanation of the registration of the face image of the visitor will be done with reference to FIG. 5, and FIG. 2 as appropriate. FIG. 5 is a flow chart showing the detail steps of the step S414.

In the robot 2, the number N of the counter which represents the total number of face image has been already obtained is reset in order to perform the image pickup of the face image of new visitor (Step S501), when it is judged that the robot 2 has received a handshake from the visitor. Then, the image pickup of the face image of the visitor is performed using the camera 21*a* (Step S502).

In this occasion, since the visitor is located in front of the robot 2 while directing his face to the robot 2 in order to shake hands with the robot 2, the front face image of the visitor can be obtained. Thereby, the full-faced image of the visitor which is required for improving the accuracy of facial recognition can be obtained with ease.

The response controller 24 of the robot 2 counts the passage of time after the start of the image pickup, and checks whether or not the predetermined time has passed (Step S503). In this embodiment, it is preferable that the predetermined time is within the planned time prepared for the handshake with the visitor.

If the predetermined time has not passed (Step S503, No), the processing proceeds to next step. If the predetermined time has passed (Step S503, YES), the processing proceeds to step S506 after the termination of the image pickup.

The response controller 24 of the robot 2 checks whether or not the total number of the face image of the visitor obtained by the image pickup exceeds the predetermined number (Step S504). If the total number of the face image is below the predetermined number (Step S504, No), the response controller 24 further performs the image pickup. If the total number of the face image exceeds the predetermined number (Step S504, YES), the processing proceeds to next step.

Here, the predetermined number is determined based on the number of face images that can be obtained normally during the handshake with the visitor. In this embodiment, for example, a total of 60 face images can be obtained during 2 seconds after the start of the image pickup.

In this embodiment, additionally, if the number of the face image per person (visitor) that can be stored in the visitor information database 34*b* is limited, the predetermined number may be determined as the same number as the limit number of the face image.

If total number of the face image exceeds the predetermined number (Step S504, YES), the response controller 24 computes the similarity of the last face image against the class image, and checks whether or not the computed similarity exceeds a threshold value (Step S505). Here, last face image is the face image obtained at the end of the image pickup of the face image. The class image is formed from all face images excepting the last face image.

To be more specific, in Step S505, the monitoring analyzer 21 performs the linear projection into the image space of all face images excepting the last image and formulates the class image, if the number of the face images of the visitor exceeds the predetermined number. Then, the monitoring analyzer 21 computes the similarity between the last face image and the class image, and send the computed result to the response controller 24. In the response controller 24, the computed result is compared with a threshold value, and it is checked whether or not the computed result exceeds the threshold value.

In the present embodiment, the computing of the similarity may be performed between each last five images and the class image obtained by the linear projection of all face images excepting last five images. In this case, since a total of five computed results are obtained, the comparison with the threshold value is performed using the average value obtained from five computed results.

If the computed similarity of the last face image against the class image does not exceed the threshold value (Step S505, NO), the response controller 24 repeats the image pickup of the face image of the visitor.

In this occasion, the number of face images to be obtained in not limited to one. The response controller 24 may obtain five face images per image pickup.

In this case, similarly, the response controller 24 computes the average of the similarity of last five images and performs, in Step S505, the comparison with the threshold value based on the computed average value.

In the present embodiment, additionally, the judgment of the similarity performed in Step S505 can be omitted. In this case, the processing proceeds to Step S506 when the total number of the face image exceeds the predetermined number in Step S504.

If the computed similarity of the last face image against the class image exceeds the threshold value (Step S505, YES), the processing proceeds to next step. Then, the robot 2 asks the name of the visitor by a voice massage "May I have your name, please?". Here, this voice message is generated based on the scenario information stored in the scenario database 29a.

The robot 2 receives the voice of the visitor through the microphone 22a and obtains the name of the visitor in the voice analyzer 22b. Then, the robot 2 sends information, which includes the name of the visitor and the face image of the visitor, to the robot control unit 3 (Step S507).

When the robot control unit 3 receives this information, the robot control unit 3 added the name of the visitor to the visitor information and stores the face image of the visitor on the visitor information database 34b (Step S508).

Thereby, next time the robot 2 has a communication with the same visitor, the robot 2 does not repeat the reception action. This is because the information such as a name and face image of the corresponding visitor is already being stored in the database.

In the present embodiment, in Step S506, the robot 2 may sound other voice messages in order to obtain the information relating to a company name to which the visitor belongs, a business title of a visitor, a data of birth, and the like.

In this case, the robot 2, based on the scenario stored in the scenario database 29a, can have a communication with the visitor and give a suitable voice message to the visitor.

In this modification, if such additional information, e.g. a company name etc., is obtained, additional information is also stored in the visitor information database 34b together with the face image.

In the present embodiment, if the robot 2 cannot obtain the name of the visitor, only face image is stored in the visitor information database 34b, and thus the visitor information (now having only ID number) is updated.

Figure 4:
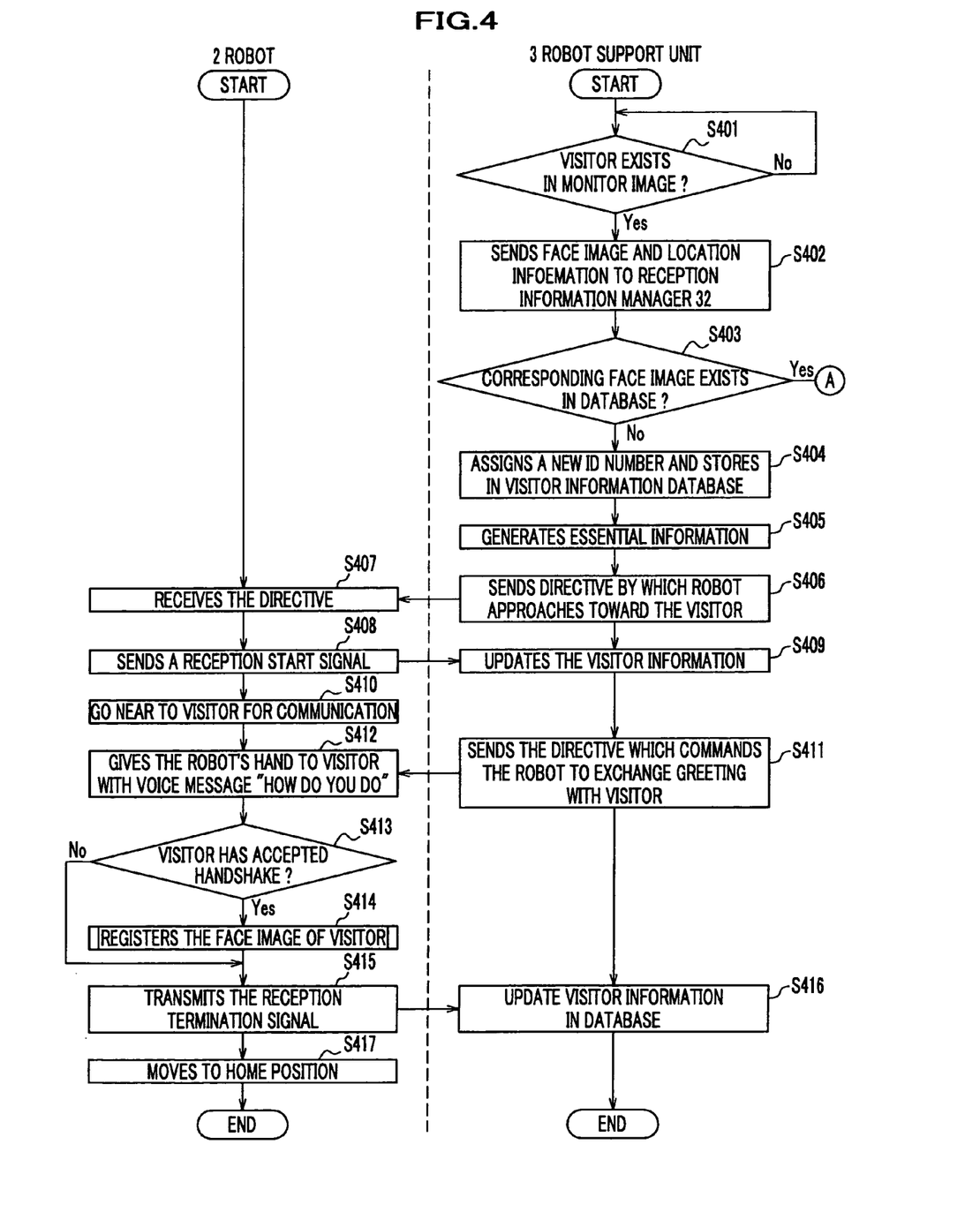
FIG. 4 is a flow chart for explaining the process of the reception action for a visitor using the reception system according to the preferred embodiment of the present invention.

Referring to FIG. 4, the robot 2 sends the reception termination signal to the robot support unit 3 (Step S415), when the image pickup of the face image of the visitor performed in Step S414 was terminated or when the visitor does not give his hand to the robot 2 within a predetermined time.

The robot support unit 3 updates corresponding information item of the visitor information stored in the visitor information database 34b, when the reception termination signal is entered from the robot 2.

If the visitor does not give his hand to the robot 2, the face image obtained through the monitoring camera 4 is stored in the visitor information database 34b. Then the information item relating to the reception action is checked so that the visitor does not accept the reception action again.

In this embodiment, next time the robot 2 has a communication with the same visitor, the robot 2 does not repeat the reception action. This is because whether or not the visitor has already accepted the reception action for new visitor can be checked by visitor information.

The robot 2 moves to the home position, e.g. the vicinity of the reception counter, based on information stored in the scenario database 29a, and then terminates the reception action (Step S417).

This is because if the robot does not move to the home position, since the robot 2 have to move to the position where next visitor is waiting when next visitor has arrived, this costs next visitor a wasting time before accepting the reception action by the robot 2. Additionally, this is because, if the robot does not move to the home position, the traffic of other person, e.g. an employee, may be disturbed by the robot 2.

In the present embodiment, additionally, since it is possible to charge a battery of the robot 2 if the robot 2 moves to the home position, the occurrence of the battery shutoff while robot 2 is under the reception action will be avoided.

[Reception Action for Guide]

Next, the processing in the reception action for guide, which is performed when it is judged that the face image exists (Step S403, YES), will be explained with reference to the flowchart shown in FIG. 6.

The reception information manager 32 searches the schedule information database 34c based on the visitor information of the visitor, and generates the essential information based on location information entered from the monitor image analyzer 31, and position data entered from the robot 2 (Step S601). Then, the reception information manager 32 send the essential information to the directive generator 33. Here, the essential information is the information to be used for generating a directive by which the robot 2 computes the similarity of the face image of the visitor.

Here, it is assumed the information, which indicates that a host (employee) has a meeting schedule with a visitor at the guest room A, is recorded in the schedule information database 34c. In this case, the essential information is generated with reference to this information, and the robot 2 performs the reception action for guide based on directive generated from this essential information.

The directive generator 33 in the robot support unit 3 generates a directive which commands the robot 2 to approach toward the visitor up to the predetermined distance, and the directive generator 33 sends it to the robot 2 via the transceiver 35 (Step S602). Here, the directive generated in this directive generator 33 includes the information for identifying the position of the visitor in the reception area.

When the robot 2 receives the directive (Step S603), the robot 2 recognizes the position of the visitor based on the information included in the directive, and simultaneously sends the reception start signal to the robot support unit 3 (Step S604).

When the robot support unit 3 receives the reception start signal, the robot service unit 3 updates the visitor information in the visitor information database 34b. To be more specific, information item with regard to the visit time of the visitor and information item with regard to the reception start signal are updated.

Then, the robot 2 moves to the position wherein the communication with the visitor is performable (Step S606).

After the arrival of the robot 2 at the target position, the directive generator 33 of the robot support unit 3 sends the directive, by which the robot 2 performs the motion to greet with the visitor, to the robot 2 (Step S607). Here, the directive includes information with regard to the face image of the visitor that has been stored in the visitor information database 34b.

In the present embodiment, the timing of the output of the directive from the directive generator 33 may be variable. For example, the directive generator 33 may send the directive, when the approach of the robot 2 to the visitor is terminated, or when the distance between the robot 2 and the visitor exceeds the threshold value. Here, the distance between the robot 2 and the visitor is computed based on the location information entered from the monitor image analyzer 31.

In the present embodiment, when the directive, by which the robot 2 performs the motion to greet with the visitor, is received by the robot 2, the robot 2 performs the motion to give the robot's hand to the visitor in order to offer to shake hands (Step S608). Simultaneously, the robot 2 refers to scenario information stored in the scenario database 29a, and sounds the voice message "Welcome Mr. Suzuki" based on the scenario.

Then, the robot 2 judges whether or not the robot 2 has received a handshake from the visitor (Step S609).

In this embodiment, this judgment can be done by using a contact sensor (not shown) disposed on the hand of the robot 2.

If the robot 2 does not receive a handshake from the visitor (Step S607, NO), the processing proceeds to Step S614 without having a communication with the visitor.

If the robot 2 has received a handshake from the visitor (Step S607, YES), the image pickup of the face image of the visitor is performed (Step S610).

The response controller 24 of the robot 2 counts the passage of time after the start of the image pickup, and checks whether or not the predetermined time has passed (Step S611). In this embodiment, it is preferable that the predetermined time is within the planned time to be required to the shake hands with the visitor.

If the predetermined time has not passed (Step S611, No), the processing proceeds to next step. If the predetermined time has passed (Step S611, YES), the processing proceeds to step S614 after the termination of the image pickup.

If the predetermined time has not passed (Step S611, No), the response controller 24 of the robot 2 computes the similarity of the obtained face image against the class image, and checks whether or not the computed similarity exceeds a threshold value (Step S612). Here, the class image is obtained by the linear projection into the image space of all face images which are sent from the robot support unit 3, together with the directive in Step S607.

If the computed similarity of the face image obtained in Step S612 against the class image does not exceed the threshold value (Step S612, NO), the image pickup of the face image of the visitor is repeated, till the computed similarity exceeds the threshold value.

Here, the number of face images to be obtained in Step S610 is not limited to one image. The response controller 24 may obtain five face images per image pickup.

In this case, the average generator 24 computes the similarity of each five images, and obtains the average from them. Then, the average generator 24 checks whether or not the average value exceeds the threshold value in Step S612.

If the robot 2 does not receive a handshake from the visitor (Step S309, NO) or if the computed similarity exceeds the threshold value (Step S612, YES), the directive generator 33 generates the directive, by which the robot 2 makes the reception action (guide) for the visitor, to the robot 2.

Thus, the robot 2 gives information required for the visitor together with the voice message "Please enter into a meeting room A" (Step S614). Here, the voice message is generated based on the scenario information stored in the scenario database 29a.

In this embodiment, additionally, the robot 2 may lead the visitor to the meeting room A in addition to the voice message or may lead the visitor to the predetermined place, e.g. a sofa in the reception area. In the latter case, it is acceptable to ask the reception staff for help by indicating a signal, which requests the reception staff to page the meeting person, on the operator PC.

The robot 2 transmits the reception termination signal to the robot support unit 3, when the reception action is terminated in Step S614 or when the robot 2 does not received a handshake from the visitor. In this case, the robot 2 transmits the face image of the visitor together with the reception termination signal, if the face image of the visitor exists.

The robot support unit 3 performs the update of each content of the visitor information stored in the visitor information database 34b (Step S616 ), when the robot support unit 3 receives the reception termination signal. In this occasion, if the face image is attached to the reception termination signal, the face image is also stored in the visitor information database 34b.

Then, the robot 2 moves to the home position, e.g. the vicinity of the reception counter, based on the scenario information stored in the scenario database 29a, and then terminates the reception action (Step S617).

Figure 6:
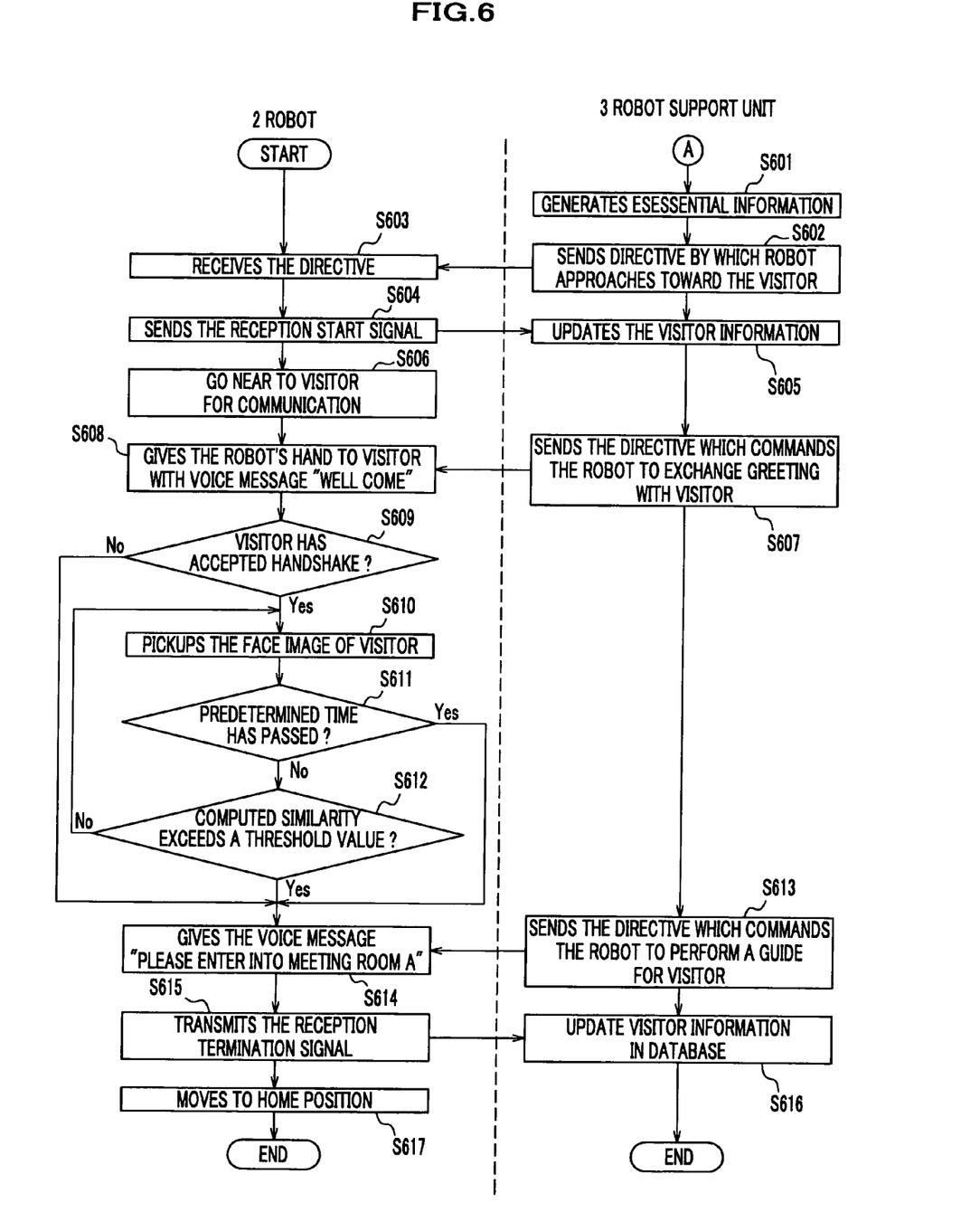
FIG. 6 is a flow chart for explaining the process of reception action for visitor using the reception system according to the preferred embodiment of the present invention.

In the flowchart shown in FIG. 6, the reception action to be performed to the visitor whose information is being stored in the visitor information database 34b and the schedule information database 34c was explained as example.

The robot 2 performs the reception action for new visitor when the visitor whose information is not stored either the visitor information database 34b or the schedule information database 34c.

According to the above described constructions etc., the front face image, which is necessary for the face recognition of the visitor, of the visitor can be obtained without making the visitor self-conscious about image pickup.

Additionally, since the face image of the visitor is repeatedly obtained till the similarity between the currently obtained face image and the previously obtained face image exceeds a threshold value, the accuracy of the face recognition can be improved.

If the unscheduled visitor whose arrival is not scheduled comes in the reception area, the face image of the visitor will be stored in the visitor information database 34b together with the ID number newly assigned to this unscheduled visitor. Thereby, since the checking of whether or not the reception action of the visitor has been achieved can be done by referring to the visitor information database 34b, the visitor who once accepted the reception action by the robot 2 can avoid accepting the same reception action from the robot 2.

In this case, the robot 2 can have a communication with the unscheduled visitor, as much as the visitor whose arrival is scheduled, for a while, e.g. till the visitor information stored in the visitor information database 34b is deleted.

In the present embodiment, since the information relating to the visitor whose information item essential for the data storage, such as a name of the visitor, was not obtained is deleted at a suitable cycle, the increasing of data to be stored in the visitor information database 34b can be controlled. That is, visitor information (personal information) which has an empty content in predetermined information items is deleted at a suitable cycle for controlling the total amount of visitor information (personal information).

In the present embodiment, the face image of a visitor, the information of the presence or absence of a visitor, and the location information of the visitor and robot 2 are obtained through the monitoring camera 4, even if the robot 2 is under the operation of the reception action for the other visitor or the visitor is not in the camera 21a of the robot 2.

Thereby, the reception action of the visitor can be smoothly performed.

Although there have been disclosed what are the patent embodiment of the invention, it will be understood by person skilled in the art that variations and modifications may be made thereto without departing from the scope of the invention, which is indicated by the appended claims.

In the present embodiment, the directive which commands the robot 2 to be operated in accordance with the directive is generated in the directive generator 33, and is sent to the robot 2 when it is required.

But directives, each of which commands the robot 2 to make different motions, may be stored in the scenario database 29a of the robot 2. In this case, the robot support unit 3 sends the command signal which indicates the at least one directive among the directives stored in the scenario database 29a, in order to operate the robot 2.

In the present embodiment, the robot 2 may includes the function of the robot support unit 3. In this case, the robot 2 directly exchanges data between the monitoring camera 4 and the operator PC by wireless. Therefore, the face recognition of the visitor is performed in the robot 2 based on the image entered from the monitoring camera 4.

In the above described embodiment, only one monitoring camera 4 is arranged in the reception area for detecting the visitor. But, the number and the installation position of the monitoring camera 4 are not limited to the above described embodiment.

Additionally, the camera 21a of the robot 2 may play a role of the monitoring camera 4. In this case, the detection and face recognition of the visitor are performed based on a face image obtained by the camera 21a of the robot 2.

In the above described embodiment, only one robot 2 is deployed to the reception area. But, a plurality of robots 2 may be deployed to the same reception area. In this case, it is possible to command each robot 2 to perform a different task (reception action).

For example, if there are two robots in the reception area, one robot performs the reception action to the visitor whose face image etc. have been already stored, and the other robot performs the reception action to the visitor whose face image is not stored and stores the obtained face image.

In the present embodiment, various modifications in the construction of the robot 2 may be acceptable. For example, the travel controller 26a of the robot 2 may be comprised of a plurality of wheels, and the robot 2 may includes a display unit which enables the communication with the visitor through a text information or an image information. Additionally, the robot 2 may include a touch-sensitive panel for allowing the visitor to input a purpose of his visit into the robot 2 through the touch-sensitive panel.

In the present embodiment, it is possible to distinguish a visitor from pedestrians (an employee) walking across the reception area, by performing a face recognition, using the reception information manager 32, to a face image obtained through the monitoring camera 4. In this case, in order to improve the accuracy of the distinction, it is preferable that all employees wear an uniform or shoes by which the robot can make a distinction between a visitor and an employee, or that all employees attach the ID card to a predetermined position on a body.

In the present embodiment, additionally, if each employee has a wireless IC tag, in which information of employee is stored, and the reception area is equipped with a receiver unit of the wireless IC tag, it is possible to make an distinction between a visitor and an employee by reading the information stored in the wireless IC tag using the receiver unit of the wireless IC tag. Thus, a distinction between a visitor and a employee can be performed irrespective of the accuracy of the face recognition to be performed by the reception information manager 32.

What is claimed is:

1. A face image acquisition method using a robot assist unit and a robot having a camera and an arm, the method comprising:
   a) detecting a target person whose face image is acquired from an image obtained by the camera;
   b) generating a directive controlling a motion of the robot at the robot assist unit;
   c) transmitting the directive from the robot assist unit to the robot when the target person is detected;
   d) moving the arm toward the target person in compliance with the directive;
   e) performing an image pickup of the face image of the target person during a handshake with the target person; and
   f) storing the obtained face image in a recording medium.

2. A face image acquisition system comprising:
   a robot having a camera and an arm; and
   a motion controller, which includes
      a visitor detector detecting a presence of a visitor,
      a directive generator generating a directive which controls the motion of the robot, and
      a face image registration unit holding a face image of the visitor, wherein
      the motion controller transmits the directive generated in the directive generator to the robot when the visitor is detected by the visitor detector, and
      the robot moves the arm toward the visitor for offering a handshake with the visitor in compliance with the directive, and performs an image pickup of a face image of the visitor using the camera during the handshake with the visitor, and
      the motion controller stores the face image acquired by the robot in the face image registration unit.

3. A face image acquisition system according to claim 2 wherein,
   the robot acquires a predetermined numbers of face images of the visitor when the image pickup of the face image of the visitor is performed, and computes the similarity of the last face image against the class image, which is generated from all face images excepting the last face image, and repeats the image pickup of the face image till the computed similarity exceeds a threshold value.

4. A face image acquisition system according to claim 3 wherein,
   the robot further includes a handshake sensor which checks whether or not the visitor has accepted the arm, wherein
   the robot checks whether or not the visitor has accepted the arm when the arm of the robot was moved toward the visitor, and the robot performs the image pickup of face image of the visitor by camera when it is judged that the visitor has accepted the handshake.

5. A face image acquisition system according to claim 2 wherein,
   the robot further includes a handshake sensor which checks whether or not the visitor has accepted the arm, wherein
   the robot checks whether or not the visitor has accepted the arm when the arm of the robot was moved toward the visitor, and the robot performs the image pickup of face image of the visitor by camera when it is judged that the visitor has accepted the handshake.

6. A face image acquisition system comprising:
   a robot having a camera and an arm; and
   a motion controller, which includes a personal information database storing a personal information, which is used for an identification of a person, and a face image of the person associated with the personal information, a visitor detector detecting a presence of a visitor and acquiring a face image of the visitor, an information manager generating essential information to be used for generating a directive which controls the motion of the robot, and a directive generator generating a directive based on essential information, wherein the motion controller refers to the personal information database based on the face image acquired by the visitor detector in order to identify the visitor when the visitor is detected by the visitor detector, if the appropriate personal information is not found in the personal information database, the information manager generates an ID information by which the visitor is identifiable, and generates the essential information, from which the directive generator generates the directive which commands the robot to acquire the face image of the visitor, the robot moves the arm toward the visitor for offering a handshake with the visitor in compliance with the directive, and performs an image pickup of a face image of the visitor using the camera during the handshake with the visitor, and the motion controller regards the ID information as the personal information, and stores the face image acquired by the robot in the personal information database together with the personal information.

7. A face image acquisition system according to claim 6 wherein, the robot requests the visitor to input the visitor information, which is information on the visitor, and the motion controller stores the visitor information on the personal information database together with the personal information.

8. A face image acquisition system according to claim 7 wherein, the robot acquires a predetermined numbers of face images of the visitor when the image pickup of the face image of the visitor is performed, and computes the similarity of the last face image against the class image, which is generated from all face images excepting the last face image, and repeats the image pickup of the face image till the computed similarity exceeds a threshold value.

9. A face image acquisition system according to claim 8 wherein, the robot further includes a handshake sensor which checks whether or not the visitor has accepted the arm, wherein the robot checks whether or not the visitor has accepted the arm when the arm of the robot was moved toward the visitor, and the robot performs the image pickup of face image of the visitor by camera when it is judged that the visitor has accepted the handshake.

10. A face image acquisition system according to claim 9 wherein, the motion controller searches the personal information which has an empty content in predetermined information items, and delete such personal information at a fixed cycle together with the face image.

11. A face image acquisition system according to claim 6 wherein, the robot acquires a predetermined numbers of face images of the visitor when the image pickup of the face image of the visitor is performed, and computes the similarity of the last face image against the class image, which is generated from all face images excepting the last face image, and repeats the image pickup of the face image till the computed similarity exceeds a threshold value.

12. A face image acquisition system according to claim 11 wherein, the robot further includes a handshake sensor which checks whether or not the visitor has accepted the arm, wherein the robot checks whether or not the visitor has accepted the arm when the arm of the robot was moved toward the visitor, and the robot performs the image pickup of face image of the visitor by camera when it is judged that the visitor has accepted the handshake.

13. A face image acquisition system according to claim 12 wherein, the motion controller searches the personal information which has an empty content in predetermined information items, and delete such personal information at a fixed cycle together with the face image.

14. A face image acquisition system according to claim 6 wherein, the motion controller refers to the personal information database based on the face image acquired by the visitor detector in order to identify the visitor when the visitor is detected by the visitor detector, if the appropriate personal information is found in the personal information database, the information manager generates the essential information, from which the directive generator generates the directive which commands the robot to compute the similarity of the face image of the visitor, the robot moves the arm toward the visitor for offering a handshake with the visitor in compliance with the directive, and performs an image pickup of a face image of the visitor using the camera during the handshake with the visitor, and the robot computes the similarity of the face image obtained by the image pickup against the class image, which is generated from face images stored in the personal information database, and repeats the image pickup of the face image of the visitor till the computed similarity exceeds a threshold value, and the motion controller stores all face images acquired by the robot in the personal information database.

15. A face image acquisition system according to claim 14 wherein, the robot further includes a handshake sensor which checks whether or not the visitor has accepted the arm, wherein the robot checks whether or not the visitor has accepted the arm when the arm of the robot was moved toward the visitor, and the robot performs the image pickup of face image of the visitor by camera when it is judged that the visitor has accepted the handshake.

16. A face image acquisition system according to claim 15 wherein, the motion controller searches the personal information which has an empty content in predetermined information items, and delete such personal information at a fixed cycle together with the face image.

17. A face image acquisition system according to claim 6 wherein, the robot further includes a handshake sensor which checks whether or not the visitor has accepted the arm, wherein the robot checks whether or not the visitor has accepted the arm when the arm of the robot was moved toward the visitor, and the robot performs the image pickup of face image of the visitor by camera when it is judged that the visitor has accepted the handshake.

18. A face image acquisition system according to claim 17 wherein, the motion controller searches the personal information which has an empty content in predetermined information items, and delete such personal information at a fixed cycle together with the face image.

19. A face image acquisition system according to claim 6 wherein, the motion controller searches the personal information which has an empty content in predetermined information items, and delete such personal information at a fixed cycle together with the face image.

* * * * *